United States Patent [19]
Priaroggia

[11] Patent Number: 4,784,462
[45] Date of Patent: * Nov. 15, 1988

[54] SUBMARINE OPTICAL FIBER CABLE WITH GROOVED PLASTIC CORE AND MANUFACTURE THEREOF

[75] Inventor: Paolo G. Priaroggia, Milan, Italy

[73] Assignee: Societa' Cavi Pirelli S.p.A., Milan, Italy

[*] Notice: The portion of the term of this patent subsequent to Sep. 1, 2004 has been disclaimed.

[21] Appl. No.: 49,677

[22] Filed: May 13, 1987

Related U.S. Application Data

[63] Continuation-in-part of Ser. No. 723,030, Apr. 15, 1985, and a continuation-in-part of Ser. No. 831,650, Feb. 20, 1986, Pat. No. 4,725,121.

[30] Foreign Application Priority Data

May 19, 1986 [IT] Italy .................. 20478 A/86

[51] Int. Cl.$^4$ ............................................. G02B 6/44
[52] U.S. Cl. .................................. 350/96.23; 264/1.5
[58] Field of Search ........................ 350/96.23; 264/1.5

[56] References Cited

U.S. PATENT DOCUMENTS

| | | | |
|---|---|---|---|
| 4,389,088 | 6/1983 | Trezequet | 350/96.23 |
| 4,690,498 | 9/1987 | Priaroggia | 350/96.23 |
| 4,701,015 | 10/1987 | Saito et al. | 350/96.23 |
| 4,703,998 | 11/1987 | Uchioke et al. | 350/96.23 |

FOREIGN PATENT DOCUMENTS 2158963 11/1985 United Kingdom ............ 350/96.23

Primary Examiner—John D. Lee
Assistant Examiner—Phan Heartney
Attorney, Agent, or Firm—Brooks Haidt Haffner & Delahunty

[57] ABSTRACT

An optical fiber submarine cable having only a central rope for withstanding the stresses to which the cable is subjected, a plastic core with interrupted but closed or substantially closed, grooves at its outer portion, at least one optical fiber in each groove, a sheath around the core, and a substantially incompressible fluid filling all otherwise empty spaces within the sheath including any such spaces between the wires of the rope and in the grooves. The grooves are separated by ribs, and before the sheath is applied the diameter of the core at the ribs is greater than the diameter of the inner surface of the sheath and the sides of the ribs are separated to provide grooves opening outwardly of the core. Also, a process for manufacturing such a cable.

10 Claims, 1 Drawing Sheet

U.S. Patent
Nov. 15, 1988
4,784,462
FIG. 1.
FIG. 2.
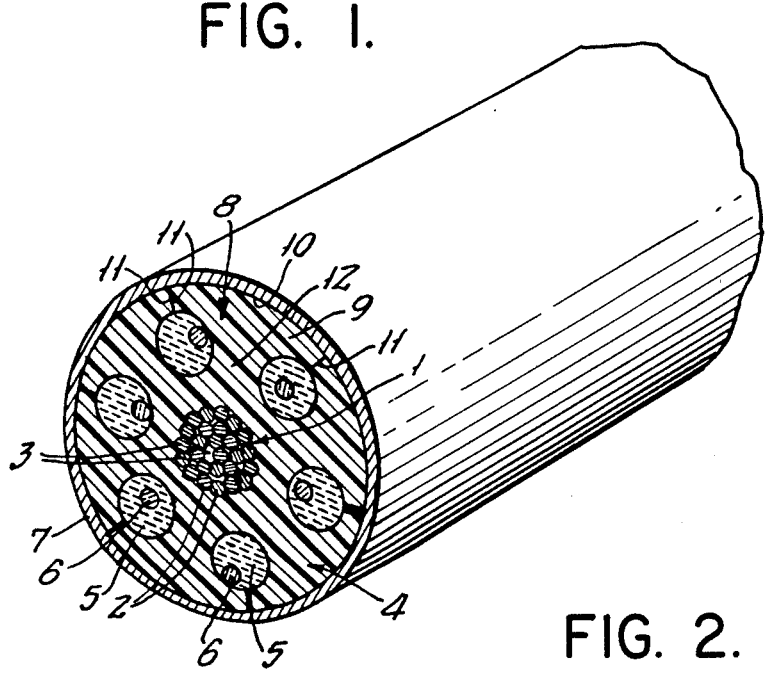
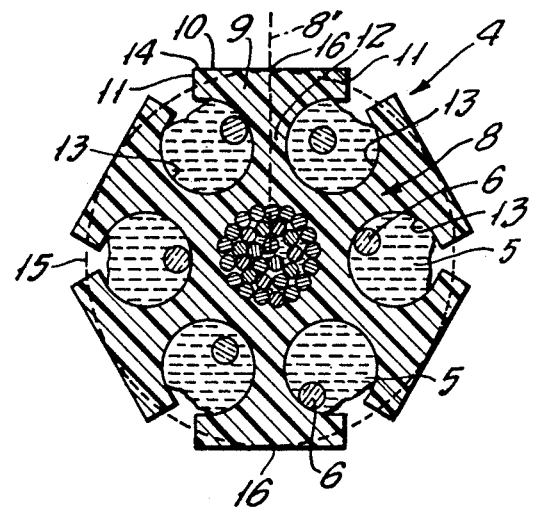
FIG. 3.
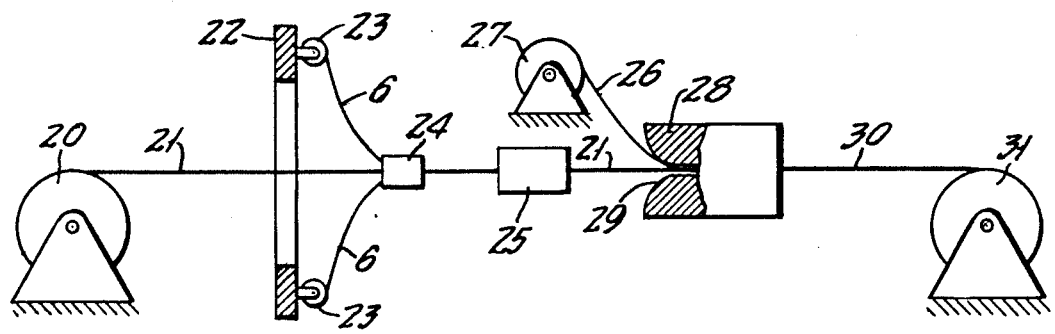

SUBMARINE OPTICAL FIBER CABLE WITH GROOVED PLASTIC CORE AND MANUFACTURE THEREOF

This application is a continuation-in-part of my copending applications Ser. No. 723,039, filed Apr. 15, 1985 and entitled Pressure Resistant Submarine Optical Fiber Cable (now U.S. Pat. No. 4,690,498) and Ser. No. 831,650, filed Feb. 20, 1986 and entitled Pressure Resistant Submarine Optical Fiber Cable (now U.S. Pat. No. 4,725,121) and is related to my copending applications Ser. No. 723,265, filed Apr. 15, 1985 and entitled Pressure Resistant Submarine Optical Fiber Cable (now U.S. Pat. No. 4,676,590), Ser. No. 746,558, filed June 19, 1985 and entitled Joint for Optical Fiber Submarine Cables (now U.S. Pat. No. 4,699,459) and Ser. No. 864,197, filed May 16, 1986 and entitled Pressure Resistant Submarine Optical Fiber Cable (now U.S. Pat. No. 4,697,875).

The present invention relates to submarine, optical fiber, telecommunication cables of the type wherein the only armoring for resisting mechanical stresses is a rope that occupies the radially innermost zone of the cable.

In the submarine cables of said type, a plastic core provided with grooves on its outer surface in which the optical fibers are loosely housed is around the rope. The core is covered with a plastic covering which serves to close or shut the grooves. A sheath made of a metallic material or of a plastic material encloses all the above-indicated elements. Cables of this type are described in the applications identified hereinbefore.

The present invention also relates to a process for manufacturing cables of said type.

In the submarine cables of the type briefly described hereinbefore, there is no armoring for resisting the hydrostatic pressure around the sheath.

The resistance to stresses which are due to the effects of the hydrostatic pressure is obtained by entirely filling with a substantially incompressible fluid every interspace existing in the cable and, in particular, the spaces in-between the wires forming the rope and the grooves of the core where the optical fibers are loosely housed.

By the term "substantially incompressible fluid" as used herein, is meant liquid substances, preferably viscous and even having a high viscosity, but gases are excluded by this term.

The submarine cables, of said type protect, in a very efficacious manner, the optical fibers from the stresses to which the cable is subjected due to the effect of the hydrostatic pressure provided that not only said interspaces are entirely filled with the substantially incompressible fluid but also the plastic material of the core, having the grooves for housing the optical fibers, are devoid of imperfections such as micro-voids.

In fact, if any imperfections exist inside the mass of plastic material forming the cable core, they would form, for example, irregularly distributed micro-cavities which, as a practical matter, cannot be filled up with a substantially incompressible fluid with the result that there is a potential risk of this giving rise to micro-folds in the optical fibers and, as a consequence, cause irreparable damage to take place for the following reasons.

The hydrostatic pressure causes stresses in the radial direction of the cable and hence, also in the plastic core of the cable. In such a situation, when the plastic material with which the cable core is formed has irregularly distributed microporosities which are unfilled with a substantially incompressible fluid, there are irregularities in the deformation to which the plastic material is subjected.

In case the resulting irregularities in the deformation of the core cause irregularities in the configuration of the grooves wherein the optical fibers are loosely housed, obstacles for the free movement of the fibers are created and, as a consequence, there is a risk of micro-folds being formed in said optical fibers which, as is known, would prove to be extremely damaging since, they could cause ruptures, or else, attenuations of the signals transmitted, thereby putting the cable out of use.

One object of the present invention is to provide submarine, optical fiber, telecommunication cables of the previously stated type which, even if layed at great depths, do not present any potential risk of micro-folds being formed in the optical fibers contained in them even though, at the time of the formation of the core, imperfections were present in the plastic material used.

Another object of the present invention is increasing the facility in executing joints between submarine optical fiber cables of said type and in this way increasing the reliability of such joints.

Another object of the present invention is to accomplish in an efficacious and secure manner, the entire filling up of the grooves of the cable core wherein the optical fibers are loosely housed with a substantially incompressible fluid.

In accordance with the present invention, a submarine, optical fiber, telecommunication cable comprises a compact anti-torsional rope, in which every interspace existing between the wires thereof is filled with a substantially incompressible fluid, is disposed at the radially innermost zone of the cable, a core of plastic material core is disposed around said rope, said core having grooves separated from one another by ribs and a sheath around and contacting the core. Said grooves communicate with the radially outer surface of said core, extend in the longitudinal direction of the cable and are filled with a substantially incompressible fluid. Said grooves loosely house the optical fibers and in a section perpendicular to the cable axis, each groove is defined by the ribs which separate each groove from the grooves adjacent to it. In the absence of the sheath, each groove has a curvilinear configuration and diverging edges, whereas, in the presence of the sheath, each groove has a circular configuration with parallel edges, the ratio, at least between the maximum diametral dimension of the core at the ribs separating the grooves and the internal diameter of the sheath being greater than 1 in the absence of a sheath, and equal to 1, when the core and sheath are in mutual contact.

The process of the invention for manufacturing submarine optical fiber telecommunication cables, comprises the steps of:

(a) impregnating a rope, which forms the mechanically-resistant armoring of a cable, with a substantially incompressible fluid and also completely filling every interspace existing between the component wires, with said fluid;

(b) forming around the rope by means of extrusion, a plastic core provided with outwardly opening grooves on its outer surface;

(c) disposing at least one optical fiber inside each of the grooves;

(d) inserting a substantially incompressible fluid into the grooves;

(e) subjecting the plastic core to radial compression to reduce its outer diametral dimension to the same value as that of the inner diameter of the sheath while drawing the edges of the core grooves closer and causing said groove edges to be parallel to one another; and (f) applying a sheath around the plastic material core of the cable.

The present invention will be better understood from the following detailed description, made solely by way of nonlimiting example, with referring to the figures of the attached drawing sheets, whereby:

FIG. 1 is a perspective view of a preferred embodiment of a cable of the invention;

FIG. 2 is a section, perpendicular to the axis of the core of the cable shown in FIG. 1 in the absence of a sheath; and FIG. 3 is a schematic diagram illustrating a production line for carrying out the process of the invention for manufacturing cables according to the invention.

As can be seen in FIGS. 1 and 2, proceeding from the inside toward the outside, a submarine optical fiber telecommunication cable, according to the invention, has a structure which is described hereinafter.

A compact antitorsional rope 1, dimensioned to resist all the stresses which can be imparted to the cable during the laying operation or during the cable raising operation, occupies the radially innermost position.

Said rope 1 is formed by a plurality of wires 2 made of a material having a high mechanical resistance to tractions, such as, for example, steel, aromatic polyamids, carbon fibers and the like, and has any otherwise empty spaces 3 in-between said wires 2 completely filled up with a substantially incompressible fluid.

Examples of such substantially incompressible fluids are petroleum jelly, silicone greases, and the like.

Moreover, there can also be incorporated in the rope 1 a wire or a tape made of a material having a high conductivity, such as, for example, a copper wire used for energizing optoelectronic repeaters for the signals transmitted by the optical fibers.

Around the rope 1, there is a core 4 of a plastic material which adheres to the outer surface of the rope 1 and fills up every interspace existing between the adjacent wires 2 which form the outermost layer of wires.

Any plastic material can be used for forming the core 4, but preferably, the core 4 is made of an aliphatic polyamid, of a polybutylene terephthalate and similar materials which have a low deformation when subjected to compression.

The core 4 has a plurality of grooves 5 where optical fibers 6 are loosely housed. As shown in FIG. 1, the grooves 5 are also substantially completely filled with a substantially incompressible fluid which preferably, is identical to the fluid which fills up the interspaces 3 between the wires 2 which form the rope 1.

The grooves 5 extend in the longitudinal direction of the cable and they have, with respect to the cable axis, either a closed helix layout, or an open helix layout, said latter term meaning that the layout of the grooves is formed by alternating S-shaped lengths or Z-shaped lengths.

The essential characteristics of the core 4 for the cables according to the invention will be described further on in this specification.

As shown in FIG. 1, a sheath 7 made of a metal or of a plastic material surrounds the core 4.

The sheath 7 can be formed by extrusion or by winding a tape around the core 4 in such a manner as to dispose the longitudinal edges side-by-side along a generatrix of the tubular body which it forms, the longitudinal edges being joined together by welding or the like.

If the sheath 7 is made out of a metallic material, it can also serve as an electrical conductor of the circuit for supplying energy to the optoelectronic repeaters of the signals transmitted by the optical fibers. Preferably, such a sheath is surrounded by a layer of plastic material, for example, a layer of polyethylene.

If the sheath 7 is made out of a plastic material, one of the electrical conductors of the circuit for supplying energy to the optoelectronic repeaters of the signals transmitted by the optical fibers can be the sea itself or, as an alternative, a conductor embedded in the plastic material of the sheath.

Moreover, around the sheath 7, there can be applied other, per se known protecting layers (not shown) of the type commonly used for submarine cables such as, for example, anti-shipworm protections and the like and the usual protecting means which are used for resisting the impacts which could be caused by submerged bodies, such as fishing nets, anchors, and the like. Around or on the sheath or the protecting layers, there can also be those devices used for weighing down the cable itself for preventing any possible shifting of the cable under the action of underwater currents.

For submarine optical fiber telecommunication cables, according to the invention, the characteristics of the core 4 set forth hereinafter are also essential.

One essential characteristic is that, in the section perpendicular to the cable axis, each groove 5, the profile of which is defined by the shape of the ribs which separate adjacent grooves from each other, should have a curvilinear form with edges diverging in the direction from the center of the core 4 toward the outer surface of the core 4 when the core 4 is not in contact with the sheath 7. However, when the core 4 is in contact with the sheath 7, said grooves must have a circular section and with said edges parallel to and preferably, in contact with each other.

Another essential characteristic for cables according to the invention, is that when the core 4 does not contact the sheath 7, the ratio, at least between the maximum diametral dimension of the core at the ribs 8 and the inner diameter of the sheath 7, is greater than 1 and that said ratio is equal to 1 when said core 4 and said sheath 7 are in contact with each other.

In FIGS. 1 and 2 illustrating a preferred embodiment of a cable according to the present invention, there is shown a cable core 4 which presents the stated characteristics which are considered essential for the cable of the invention.

As can be seen in FIG. 2, which shows a transverse section of the cable core 4 when it is not in contact with the sheath 7, the adjacent ribs 8 which separate and define each groove 5 have a substantially T-shape profile with the head 9 having rectilineal portions 10 and 11 and a leg 12 having curvilinear side walls 13 joined to the head 9.

More particularly, the rectilineal portion 10 at the radially outermost portion of the head 9 of each rib 8 is tangent to a circle 15 having a diameter equal to the inner diameter of the sheath 7 at the point of intersection of the axis of symmetry 8' of the rib 8 which lies in a radial plane containing the cable axis.

The rectilineal portions 11 which define the lateral edges of the head 9 are substantially perpendicular to the rectilineal portion 10 and a portion 11 on one rib 8 is spaced from the portion 11 on the next adjacent rib 8 so that such portion will contact, or be substantially in contact, when the sheath 7 is applied over the core 4.

With said form of the ribs 8, each groove 6 has a curvilinear form defined by the curvilinear walls 13 of the legs 12 of two adjacent ribs 8, and the ribs 8 have diverging edges 11 which diverge in the direction from the center to the outer surface of the core 4.

Moreover, as shown in FIG. 2, the ratio between the maximum diametral dimensions of the core 4 at the corners 14 of the ribs 8 and the inner diameter of the sheath 7 which, in the particular embodiment shown, is the diameter of the circle 15 which is tangent at the mid-point 16 of the ribs 8, is greater than 1.

The fact that, in the particular embodiment illustrated in the FIG. 2, the circle 15, representing the inner surface of the sheath, is tangent at the mid-point 16 of heads 9 of the ribs 8, is not to be taken as the only size of circle which can be used. In fact, the circle which defines the inner surface of the sheath 7 can also have a diameter which is slightly less than that of the circle 15 shown in FIG. 2. The choice of a particular circle size defining the inner surface of the sheath of a cable according to the invention is dictated only by the amount of the compression which it is desired to impart to the plastic material out of which the cable core is formed.

The amount of said compression depends upon the depth at which the cable is laid and upon the amount of the imperfections (microporosites) which one can expect to find in the plastic material which is a function of the particular polymer used and upon the production conditions which are adopted. Such amounts are known to those skilled in the art or can be determined empirically and allow them to determine for each specific application the optimum value for the inner diameter of the cable sheath.

The applying of a sheath over the core of the cable shown in FIG. 2 causes a deformation of the elastic type, or of the thermodilatable type, depending upon the conditions under which said deformation is effected, of said core 4, the form of which becomes modified into the form illustrated in FIG. 1.

As a consequence of the modification of the form of the core 4 into the form shown in FIG. 1, the ratio between the maximum diametral dimensions of the core 4 and the internal diameter of the sheath 7 is equal to 1.

Moreover, as shown in FIG. 1, the grooves 5 have assumed a circular form and the edges 11, are parallel and lie in radial planes containing the cable axis. Preferably, said edges 11 are in mutual contact, and said grooves 5 are completely filled up with the substantially incompressible fluid which was introduced in them in a measured quantity, when the core 4 had the configuration shown in FIG. 2.

In addition to this, the portion 10 of the head 9 of the single ribs 8 has assumed an arc of a circle configuration, such arc having a radius equal to the radius of the inner surface of the sheath 7.

A cable, according to the invention, is manufactured with a process which also forms an object of the present invention and which can be carried out by means of a production line which is schematically shown in FIG. 3.

The first phase of the process, consists of impregnating, with a substantially incompressible fluid, such as, for example, a petroleum jelly, a silicone grease and the like, a compact anti-torsional rope intended to form the mechanically resistant armoring of the cable. During this impregnating step, each otherwise empty space existing between the component wires of the rope is filled up with the incompressible fluid.

There next follows the step of forming with extrusion means, around the rope and in contact with it, a plastic core provided with the grooves on its radially outermost surface.

In particular, the plastic core formed during this step has larger diametral dimensions than the inner diameter of the sheath to be subsequently applied over the core.

Said grooves in the plastic core have, in the section perpendicular to the cable axis, the curvilinear form and diverging edges described in connection with FIG. 2.

The combination 21 of the rope and the plastic core formed in the previous steps, can be caused to advance towards workstations where the successive steps of the process are carried out, or else, the combination 21 can be collected on a bobbin 20 till such time as it is subjected to said successive steps.

In the latter case, the combination 21 is unwound from the bobbin 20 and subjected to the step of disposing at least one optical fiber in each groove of the cable core.

For effectuating this step, the rope core combination 21 is caused to pass into a device which is known per se and which comprises a rotating cage 22 upon which are mounted the reels 23 on which the optical fibers 6 are stored and from which the fibers are unwound for being inserted into the grooves 5 of the core by means of perforated devices in a mechanism 24 of a per se known type and which is adapted for such purpose.

There now follow the steps of introducing said substantially incompressible fluid at room temperature into the grooves 5, by means of a per se known doser 25 provided with nozzles having their ends positioned inside the grooves.

In particular, said substantially incompressible fluid at room temperature which is inserted into the grooves has a volume quantity per unit of the groove length which is at least equal to the volume per length unit which the groove has after the sheath 7 is applied around the core.

When the last-mentioned step has been completed, the structure is, for example, the structure shown in FIG. 2. Thereafter, the further steps of subjecting the plastic core 4 of the cable to a radial compression takes place.

Through said radial compression, the outer diametral dimensions of said core are reduced to a value which is equal to that of the inner diameter of the cable sheath which is then formed on it. Simultaneously, the form of the transverse section of each groove is modified in such a way as to give them a circular configuration and to cause the edges 11 of said grooves to become parallel and preferably, in mutual contact.

The cable sheath 7 can be formed by extruding plastic or metallic material around the core which has already been radially compressed in the way described.

As an alternative, the sheath 7 can be obtained by longitudinally folding a metallic tape, around the already radially compressed core, in such a manner as to dispose, in an edge-to-edge way, the longitudinal edges of the tape which are welded, or otherwise, joined together in a permanent way.

In the latter case, as shown in FIG. 3, a metallic tape 26, coming from a bobbin 27, is made to transit along with the rope core combination 21 (having for example, the structure illustrated in FIG. 2) inside a body 28 provided with a funnel-shaped through cavity 29 wherein the plastic core is deformed by means of radial compression and where a tubular form is conferred to the tape 26, and the longitudinal edges are reciprocally welded edge-to-edge on exiting thereof from the body 28 to provide the sheath.

During the radial compression applied to the plastic core, there can also be effectuated a heating, at least of the outermost portion of the core, for conferring a thermo-deformability to the plastic material forming it, for example, by direct head conduction by the body 28 which, in this case, is provided with heating means.

The cable 30 manufactured by means of the process described and which has, for example, the structure shown in FIG. 1 can be collected directly on bobbin 31, or alternatively, prior to being collected on a bobbin, the cable provided with a sheath, can be subjected to a further compacting operation by passing it through a threading die or by subjecting it to rolling to provide a radial compression which assures a perfect adhesion between core and sheath, at every point.

In the process, according to the invention, the steps for deforming the plastic sheath by radial compression and for so forming the cable sheath around said core and for causing the sheath to adhere perfectly to the core, can either be carried out simultaneously or else, in successive stages by means of per se known equipment suitable for this purpose.

In the latter case, the plastic core, in the grooves of which the optical fibers as well as the practically incompressible fluid are already present, are first subjected to a radial compression inside a threading die which is, for example, heated to a temperature of 150°.

On issuing from the threading die, a sheath, for example, a metal sheath, is formed around the core by any conventional means Subsequently, the thus obtained cable is subjected to a further compacting by subjecting it to rolling or by passing it through another threading die which assures a complete and close contact between core and sheath.

From the description of both, a cable according to the invention as well as its manufacturing process and from the following considerations, it will be understood that the proposed objects are attained.

The fact that, in a cable according to the invention, the plastic core enclosed in the sheath is in a radially compressed state signifies that the plastic material of the said core is in a compact state and hence, that any microporosity which may have existed, was eliminated by such compacting.

This means that, in a cable according to the invention, there is a reasonable certainty that no unfilled void spaces are present in the cable and that as a consequence, the resistance of the cable to hydrostatic pressure is optimized. Therefore, there is no fear that neither any localized yielding of the plastic material forming the core nor any consequent origination of local deformations in the section of the grooves which could provide an obstacle to the movements of the optical fibers will occur.

Prevention of any local deformations in the grooves, after the compacting applied to the plastic material of the cable core, is due to the particular curvilinear form with diverging edges of the grooves which are transformed by the compacting into a circular form with parallel edges. Consequently, any potential risk of micro-folds in the optical fibers of the cable is eliminated.

Moreover, the optimization of the resistance to hydrostatic pressure, in a cable according to the invention, is also assured by the fact that, in the cable, it is possible to obtain, in a reliable manner, a complete filling up of every portion of the grooves housing the optical fibers with a substantially incompressible fluid in spite of the fact that, in the cable provided with a sheath, said grooves are formed by circular shaped through cavities which are outwardly shut for better protecting the optical fibers.

The attainment of this result is a consequence of the fact that the inserting of the substantially incompressible fluid into the grooves is carried out while said grooves are outwardly open. First of all, this operation is easy to effectuate and permits the introduction of the substantially incompressible fluid at room temperature which substantially corresponds to the working temperature of the cable.

The inserting into the grooves of the substantially incompressible fluid at room temperature obviates any volume variations in the fluid resulting from thermal variations occurring during the cable construction of the cable. Hence, such step eliminates any risk of having an incomplete filling up of said grooves due to the shrinking effects resulting from said thermal expansions in the fluid, the evaluation of which, as those skilled in the art know, is difficult and uncertain.

Moreover, the fact that the plastic material of the cable core was subjected to radial compression for applying a sheath makes the formation of cable joints easier and more reliable. In fact, when making a joint which requires the sheath to be removed from the extremities of the two cable lengths to be joined, the opening of the grooves outwardly takes place in a practically automatic way after the sheath has been removed. This provides easy access to the optical fibers of each cable length which must be joined end-to-end when making a joint.

In fact, on the removal of the sheath, the plastic material of the core is freed from the compressional stresses existing in it, and the opening of the grooves is effectively automatic if the compression state of the plastic material of the core is within the elastic range. Nevertheless, if the deformation due to the effects of the radial compression exercised on the core takes place in the plastic field, then, a simple heating of the outer surface of the core with a resulting automatic thermodilation, causes the grooves to open without any further operations.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A submarine, optical fiber telecommunication cable comprising:
   an axially disposed anti-torsional rope formed by a plurality of wires and having the interspaces therein filled with a substantially incompressible fluid;
   a core of plastic material around said rope, said core having a plurality of peripheral spaced, longitudinally extending grooves in the radially outer portion thereof with ribs intermediate said grooves, the wall of each of said grooves being discontinuous in cross-section at the radially outermost surface of said core but having radially extending, facing edge surfaces of said core adjacent to each other where said wall is discontinuous;

at least one optical fiber received in said grooves;

a substantially incompressible fluid filling any otherwise empty spaces in said grooves; and a sheath around and engaging said core, said grooves, in the absence of said sheath, having a curvilinear cross-section and said facing edge surfaces being spaced from each other and the diametral dimension of said core at said ribs, in the absence of said sheath, being greater than the diametral dimension of the inner surface of said sheath, whereby the outer surface of said core conforms to the inner surface of said sheath when said sheath is applied thereto by reason of compression of said core.

2. A submarine, optical fiber telecommunication cable as set forth in claim 1 wherein said grooves have a circular cross-section.

3. A submarine, optical fiber telecommunication cable as set forth in claim 1 wherein said facing edge surfaces abut.

4. A submarine, optical fiber telecommunication cable as set forth in claim 1 wherein said core is made of an expansible plastic material which increases in size upon removal of said sheath.

5. A submarine, optical fiber telecommunication cable as set forth in claim 1 wherein each of said ribs is T-shaped in section, the T-shaped end of said rib being at the outer surface of said core, and the T-shape being symmetrical with respect to a radial plane containing the axis of said cable, said T-shaped end, in the absence of said sheath having a radius substantially equal to the radius of said inner surface of said sheath at the axis of symmetry of said T-shape but having a greater radius at each side of said axis of symmetry and the lateral sides of said T-shaped rib forming said facing surfaces.

6. Process for manufacturing a submarine, optical fiber telecommunication cable comprising:

impregnating a rope formed by a plurality of wires with a substantially incompressible fluid;

extruding a core of plastic material with a plurality of peripherally spaced, outwardly open longitudinal grooves around said rope;

disposing at least one optical fiber in said grooves;

inserting a substantially incompressible fluid in said grooves; and while radially compressing said core, applying to said core a sheath having an inner surface diameter less than the outer diameter of said core before compression thereof around said core.

7. Process for manufacturing a submarine, optical fiber telecommunication cable as set forth in claim 6 wherein each of said grooves has an opening at the outer surface of said core defined by radially extending surfaces of the plastic material of said core and wherein said radially extending surfaces are brought into contact during the compression of said core.

8. Process for manufacturing a submarine, optical fiber telecommunication cable as set forth in claim 6 further comprising heating of the outermost portion of said core during the compression of said core.

9. Process for manufacturing a submarine, optical fiber telecommunication cable as set forth in claim 6 wherein said substantially incompressible fluid is inserted in said grooves at room temperature and in an amount per unit length of said grooves which is at least equal to the volume per unit length of said grooves after compression of said core.

10. Process for manufacturing a submarine, optical fiber telecommunication cable as set forth in claim 6 wherein said core is compressed prior to the application of said sheath thereto.

* * * * *